E. J. GOLDBLATT.
GAS REGULATING MEANS.
APPLICATION FILED FEB. 10, 1912.

1,069,084.

Patented July 29, 1913.
3 SHEETS—SHEET 1.

Witnesses
Milton Lenoir
R. E. Wighton.

Inventor
Edward J. Goldblatt,
By Heidman Street
Attorneys.

E. J. GOLDBLATT.
GAS REGULATING MEANS.
APPLICATION FILED FEB. 10, 1912.

1,069,084.

Patented July 29, 1913.
3 SHEETS—SHEET 2.

Witnesses
Milton Lenoir
R. E. Wighton

Inventor
Edward J. Goldblatt
By Heidman Street
Attorneys.

E. J. GOLDBLATT.
GAS REGULATING MEANS.
APPLICATION FILED FEB. 10, 1912.

1,069,084.

Patented July 29, 1913.

3 SHEETS—SHEET 3.

Witnesses

Inventor
Edward J. Goldblatt,
Attorneys.

UNITED STATES PATENT OFFICE.

EDWARD J. GOLDBLATT, OF CHICAGO, ILLINOIS.

GAS-REGULATING MEANS.

1,069,084. Specification of Letters Patent. Patented July 29, 1913.

Application filed February 10, 1912. Serial No. 676,775.

*To all whom it may concern:*

Be it known that I, EDWARD J. GOLDBLATT, a citizen of the United States, and resident of Chicago, in the county of Cook and State of Illinois, have invented new and useful Improvements in Gas-Regulating Means, of which the following is a description, reference being had to the accompanying drawings, which form a part of my specification.

My invention relates more especially to means whereby the flow of gas from its source of supply to the point of consumption may be controlled; the invention being more especially adapted for use on vehicles, such as automobiles, and the like, where the gas for use in the various lamps of the vehicle is contained in a tank or receptacle under pressure, which tanks or receptacles are from time to time replaced by newly charged receptacles, which are mounted in a certain manner on the vehicle and generally at a point beyond the reach of the operator while in the automobile or vehicle.

The object of my invention is to provide means whereby the flow of gas from the tank or receptacle may be controlled by the operator while seated in the automobile or vehicle after the tank has been connected up and the valve in the tank itself has been opened to permit the flow of gas into the passages or conduits of my improved device.

A further object of the invention is to provide means whereby a predetermined pressure of gas at the point of combustion may be maintained after the flow has been regulated, at the same time permitting the operator to shut off the flow of gas to the lamps and again open the passages and obtain the flow at the previously determined pressure, without the necessity of stopping the automobile or vehicle to look at the burners of the lamps supplied from said device; the means being especially adapted for use where mechanism is provided for electrically igniting the lamps while the operator is seated in the vehicle.

Other advantages inherent in the device will be apparent from the following description.

Figure 2:
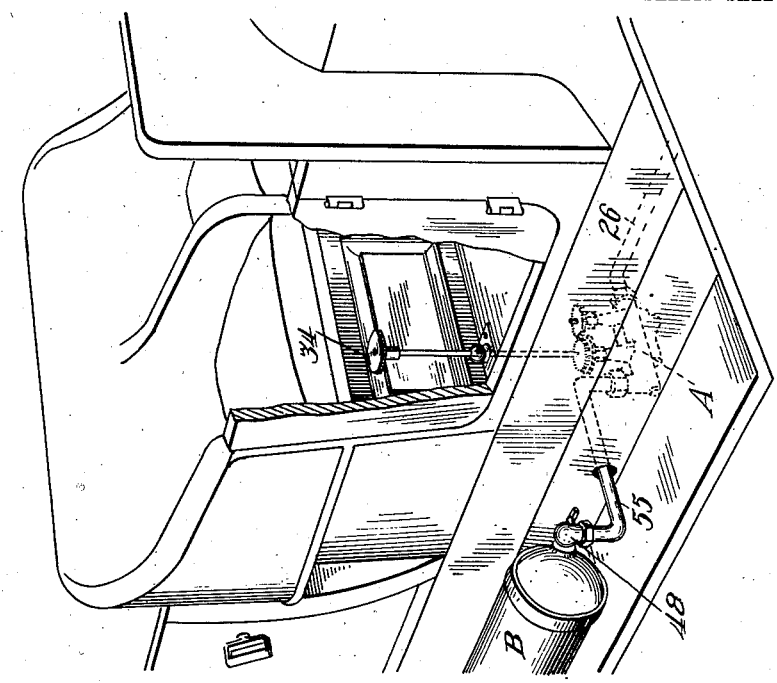
Figure 1:
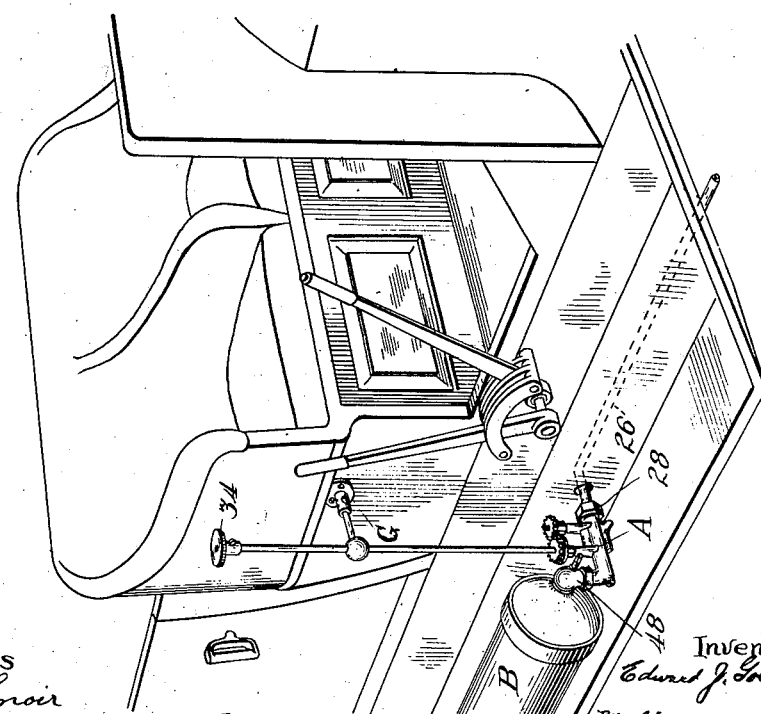
Figure 3:
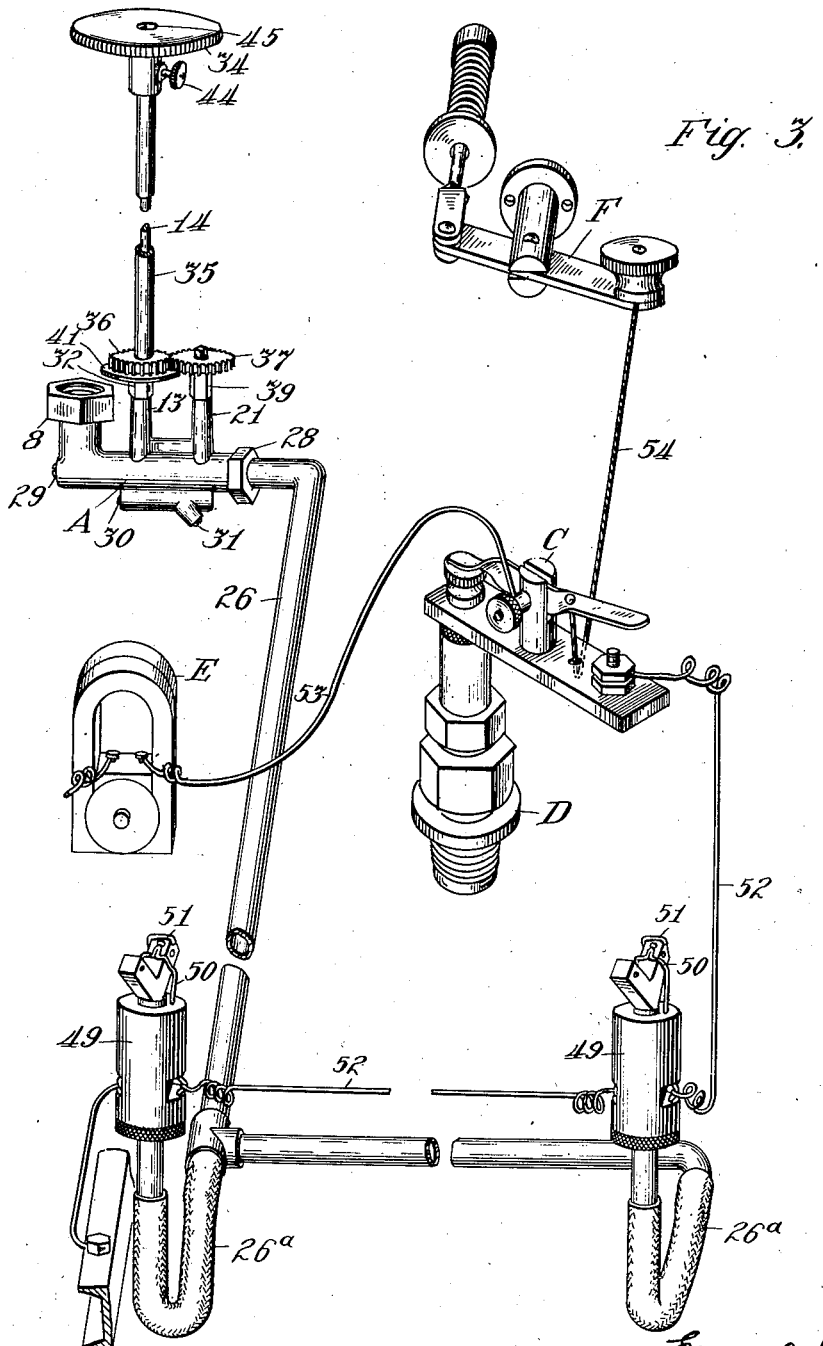
Figure 4:
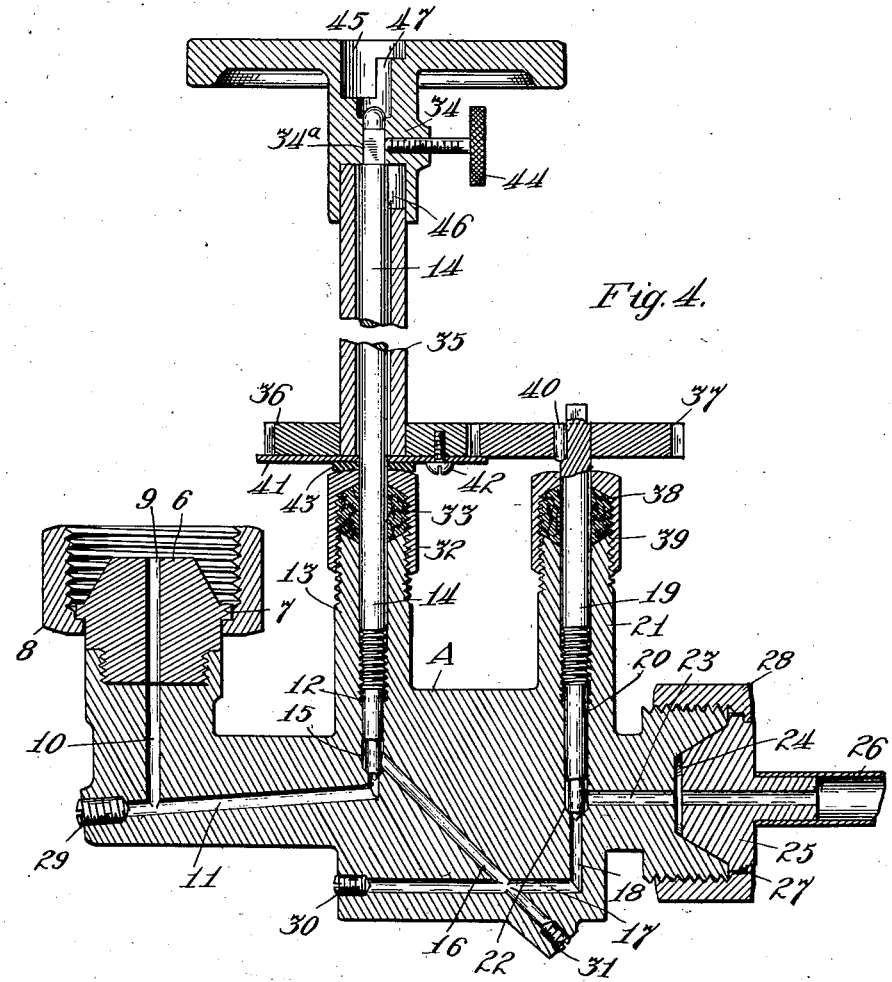
Figure 5:
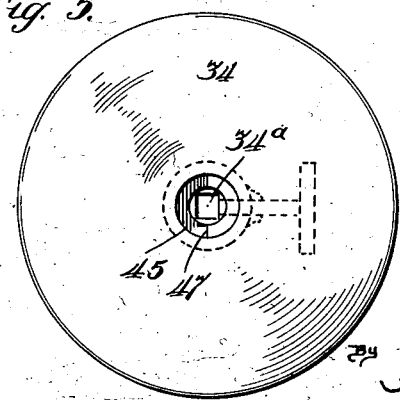

In the drawings: Figure 1 is a perspective view of a portion of vehicle or automobile, showing part of the gas tank or receptacle provided with my improved regulating device. Fig. 2 is a similar view illustrating a modified manner of attaching my device. Fig. 3 is a diagrammatic view of my improved mechanism showing a manner of conveying the gas to the burners; the view illustrating the different parts in perspective, and showing the various elements whereby the gas may be conveyed from the tank to the burners and electrically ignited from a point in the vehicle within reach of the operator. Fig. 4 is a vertical sectional view of the regulating device. Fig. 5 is a plan view of the operating key or mechanism.

In the exemplification of my invention, as illustrated in Fig. 4, the gas controlling and regulating means comprise a casing or member A, which is provided with suitable passages for the gas from the inlet end thereof, past the various valves, to the point of discharge or connection with the conduit leading to the lamps; for example, the inlet end of the member or casing A is preferably provided with the nozzle or member 6 which as shown may be secured to the casing A by screw threads; the nozzle 6 being provided with a tapered upper end which is adapted to fit into the discharge end of the supply tank B, see Fig. 1, or a suitable connection, see Fig. 2; the discharge end of the tank being usually provided with a flaring orifice into which the nozzle or member 6 may extend. The discharge end of the tank is externally screw threaded, and in order to provide a tight joint or union, I provide the nozzle 6 with the annular shoulder 7 which is engaged by union nut 8. It is apparent from this construction, that by screwing nut 8 onto the externally threaded discharge end of the tank, a tight union will be effected between member A and the tank B.

The nozzle 6 has a central port or passage 9 which registers with the vertically extending bore or passage 10 in the member A, and this passage 10 communicates with the longitudinally extending passage 11. The passage 11 is preferably made to extend from one end of member A to a point where it connects with the vertically extending passage 12, which leads upwardly through the stem 13, which forms a guide for the needle valve 14. The lower end of valve 14 is slightly reduced so as to provide a chamber at the point 15, immediately above the seat of the valve. Communicating with chamber 15 at a point above the connection between passage 12 and passage 11, is a passage 16, extending preferably at an angle to the preceding passages as clearly shown in Fig. 4.

This passage 16 is shown leading from the bottom of member A to a point above the seat of needle valve 14, and is intersected by a passage 17 which has an upward extending portion 18, which provides a seat for the needle valve 19. This needle valve 19 extends through the vertically extending passage 20 in the upwardly extending stem 21 which forms a guide for the valve. The lower end of needle valve 19 is also slightly reduced so as to provide the chamber 22, above the seat of the valve, which communicates with the longitudinally extending passage 23, extending through the discharge end of member A.

The discharge end of member A is preferably externally threaded as shown in Fig. 4 and provided with the flared orifice 24 which is adapted to receive the oppositely beveled end of member 25, to which is connected the conduit 26 which conveys the gas to the lamps or place of consumption. In the construction illustrated, the discharge end 25 is shown provided with an annular shoulder 27, which is engaged by the union nut 28, which nut is adapted to screw onto the externally threaded discharge end of member A, as shown, whereby a tight union or connection will be effected between the beveled surfaces mentioned.

As the various passages are preferably bored in member or casing A, and in order to permit their being readily cleaned, they are formed in the different directions, but in direct or straight lines, shown in Fig. 4, with the outer ends of the passages 11, 16, 17, provided with the screw plugs 29, 30, 31. It is apparent from the construction shown, that by removing the plugs 29, 30, 31, removing the needle valves 14 and 19, and by detaching member A from the gas tank and from the conveying conduit through the unscrewing of union nuts 8 and 28, that the passages will be readily accessible, permitting them to be thoroughly cleaned, should occasion require; the passages being so formed that they may be readily drained.

The stem 13 of member A is provided with internal screw threads which mesh with threads provided on the lower part of the stem of needle valve 14, as clearly shown in Fig. 4, in order to control the position of the valve. The upper outer end of stem 13 is preferably screw threaded as shown, so as to receive the nut 32 whereby the packing 33, which surrounds the stem of needle valve 14, is firmly held in place, thereby providing a tight joint to prevent any flow of gas along the stem. The upper surface of stem 13 is preferably beveled in the manner shown in Fig. 4, so that when nut 32 is screwed down onto stem 13, the packing 33 will be forced down onto the beveled surface of the stem and firmly against the stem of needle valve 14.

The upper end of the stem of needle valve 14 is preferably made angular in cross section so as to fit a squared or angular opening 34ª provided in the shank or stem of the key 34, see Fig. 5. The upper part of the stem of valve 14 is provided with a sleeve 35 to the lower end whereof is secured a pinion 36 which meshes with a pinion 37 secured to the upper end of the stem of needle valve 19. This valve 19 screws into the stem portion 21 of member A, similar in manner to the valve 14, as previously described, and this valve is also made gas tight by the packing 38 which is maintained in place and controlled by the nut 39 which screws onto the stem portion 21. Pinion 37 is preferably secured to the upper end of valve 19 by a key 40; and the upper end of the valve stem 19 is preferably made to extend slightly beyond the pinion 37 and is formed angular in cross section so as to adapt it to a suitable key whereby the valve 19 may be operated, should the key 34 be misplaced.

In order to prevent sleeve 35 and its pinion 36 being withdrawn from the upper part of the stem of valve 14, I secure an annular plate or member 41 to the bottom of pinion 36, by means of the screw 42, or otherwise. As shown, the plate 41 is of greater diameter than pinion 36 and overlaps pinion 37 (which is securely fastened on the stem of valve 19) thereby preventing the withdrawal of the sleeve 35 and pinion 36. I also prefer to provide a washer 43 intermediate of pinion 36 or its plate 41, and the upper part of nut 32.

The operating key 34 is preferably shown in the nature of a disk, see Fig. 5, provided with a central shank or hub portion which is provided with an enlarged opening to receive the upper end of sleeve 35; which gives it bearing; the central part of the opening is extended and angular in cross section as previously described, forming the opening 34ª which receives the upper square end of the stem of valve 14. If desired, the key 34 may be held in place on stem of valve 14, by the thumb or set screw 44. The upper side of this key 34 is provided with opening 45, of inverted L-shape in cross section. This opening 45 corresponds to the shape of the upper end of sleeve 35, which is provided with the cut away portion 46 adapted to receive the extended portion 47 of the key. It is thus apparent from the description that the key 34 is intended to operate valves 14 and 19 separately, by being adapted to fit the stem of valve 14 when in one position and the sleeve 35 when the key is inverted; valve 19 being operated through the medium of sleeve 35 and the meshing pinions 36 and 37.

In practice, after the gas receptacle or tank B has been properly connected to nozzle 6 by means of union nut 8, valve 48, which is provided on the tank, is then opened so as to permit the gas to enter the passages of member A; valve 14 having been previously opened so that gas will flow to the seat of valve 19. Valve 19 is then opened by inverting the key 34, from the position shown in Fig. 4, so that the slot or opening 45 will engage with sleeve 35, and its rotation will induce the pinions to be rotated. The valve 19 is then turned so as to provide sufficient or the desired pressure at the burners of the lamps, thus regulating the flame, which is accomplished by the operator before seating himself in the vehicle. Having determined the pressure, in order to give the desired size of flame, key 34 is then withdrawn from its inverted position and placed in the position shown in Fig. 4, namely, out of operative relation with sleeve 35. By placing the key 34 in the position shown in Fig. 4, it is put into operative relation with the stem of valve 14, which may be considered the controlling valve. It is evident that after the pressure or flow of gas has been determined by the regulating valve 19, the flow of gas to the burners may be controlled or shut off by the operator in the vehicle through the operation of controlling valve 14; and when it is again desired to ignite the lamps, the operator need only open valve 14, without leaving his position in the vehicle, as the "setting" of valve 19 will give the predetermined flow or pressure.

As previously stated my improvement is especially intended for use in connection with automobiles wherein the burners are to be electrically ignitetd. For example, in Fig. 3, I illustrate, diagrammatically, one method of employing my invention, wherein the member or valve casing A is shown connected to a conduit 26, which may extend beneath the body or vehicle and lead forward to a point in proximity to the lamps, where the conduit 26 is shown provided with suitable flexible connections 26ᵃ which supply the gas to the burners 49, 49. These burners 49 are shown provided with suitable electrodes 50 and 51, one of which is connected to a terminal 52, which leads to a contact point of a suitable electric switch C, which switch is shown mounted on a spark plug D of one of the cylinders of an engine; the switch being, of course, insulated from the spark plug; and the switch is electrically connected through the lead 53 with the magneto E; the switch C being operated from the seat of the operator by means of the spring controlled mechanism F, through the medium of the cord 54.

In Fig. 1, I illustrate my improved regulating means located immediately adjacent to the gas tank or receptacle B and to the outside of the body of the vehicle; the upwardly extending concentric stem of valve 14 and the sleeve 35 being held in proper position by a bracket G of any suitable construction; thus enabling the means to be controlled or operated from the seat of the operator.

In Fig. 2, I show a modified manner of securing the means in place, whereby the operating stems are brought up through the floor of the vehicle and at the same time within reach of the operator. In this construction, an intermediate connection or pipe 55 is provided, one end of which is connected to the outlet end of tank B while the other end is connected to the inlet end of member A by means of a suitable union nut as at 8. By employing the style of gas tanks at present more generally used, it is necessary to have the same mounted in a horizontal position in order to obtain the proper flow of gas.

My construction shown and described is especially adapted for use in connection with the style of gas tanks referred to, and as shown in Figs. 1 and 2, permitting the tanks to be mounted as previously stated so as to secure the proper flow of gas.

From the construction shown and described, it will be seen that but one key or operating member is necessary; and when the key or member 34 is removed by the operator neither valve can be tampered with.

I have shown and described what I believe to be the simplest and best form of my invention, but the same may be altered in certain details, and the location and connection thereof to the gas tank or reservoir may be modified without departing, however, from the spirit of my invention, and I do not wish to be understood, therefore, as limiting myself to the exact constructions shown and described, but

What I claim and wish to secure by Letters Patent is:—

1. Means of the class described, comprising a casing having an inlet and an outlet and provided with a number of communicating gas passages intermediate of the inlet end and outlet end thereof, a portion of said passages being provided with valve-seats at points in proximity to the point of union of several of said passages, valves arranged within the said passages provided with the valve-seats and adapted to take onto said seats, the one valve being arranged in advance of the other whereby the flow of gas may be controlled by either or both of said valves, means intermediate of the stems of said valves whereby either valve may be operated from the same point of operation, and mechanism adapted to operate one of said valves when in one position and operate the other valve when in a second position.

2. Gas regulating means, comprising a member or casing provided with a passage for gas, said passage being provided with several valve-seats arranged one in advance of the other, valves arranged to take onto said seats, a pair of concentric members, one of said members adapted to operate one of the valves, and means between one of said members and the other valve whereby the last mentioned valve may be separately operated.

3. A device of the class described, comprising a member provided with a gas passage extending through it from end to end, the passage being provided with several valve-seats arranged one in advance of the other, a pair of needle valves arranged to take onto said seats, a member arranged concentrically with the stem of one of said valves, and means intermediate of said member and the stem of the other valve whereby either valve may be operated from the same point.

4. A device of the class described, comprising a casing provided with communicating gas passages intermediate of its ends, means whereby said casing may be connected to a source of gas supply and to a gas conveying conduit so as to form gas tight joints, the casing being provided with valve-seats at the points of union of a portion of said passages, valves arranged within the casing and adapted to take onto said seats, one of said valves being provided with an elongated stem, a sleeve mounted on said stem arranged to rotate thereon, and means intermediate of said sleeve and the stem of the other valve whereby either valve is operable from the same point.

5. Means of the class described, comprising a casing having an inlet and an outlet and a gas passage extending from the inlet end to the outlet end thereof, the inlet and outlet ends being provided with beveled surfaces whereby gas tight connections may be effected with the gas supply and the conveying conduit, said passage being provided with two valve seats arranged one in advance of the other, a pair of needle valves arranged vertically within said casing and adapted to take onto said seats, means intermediate of the stems of said valves whereby either valve is made operable from the same point, and mechanism adapted to be in operative relation with the stem of one valve when in one position and arranged to control the other valve when in an inverted position.

6. Gas regulating means for automobiles and the like, comprising a member or casing provided with an inlet and an outlet and with communicating gas passages between the inlet and outlet, said member being provided with a tapered nozzle at the inlet end thereof, the outlet end being provided with tapered walls surrounding the outlet orifice, a pair of valve-seats arranged one in advance of the other and in the passages through said member, a pair of needle valves extending vertically within said member and arranged to take onto said seats, the stem of one of said valves being extended, a member concentric with said stem, means intermediate of said concentric member and the stem of the other valve whereby said valves may be operated from the same point of operation, and an operating key arranged to fit the extended stem of one valve when in one position and to fit the concentric member when in another position.

7. Gas regulating means for automobiles and the like adapted to be located intermediate of the gas tank and the conduits for the lamps, said means comprising a member having upwardly extending stem portions, needle valves arranged longitudinally within said stem portions, a gas passage extending through said member from end to end and arranged to be intercepted by said valves, concentric members arranged above one of said stem portions, and mechanism intermediate of one of the concentric members and the valve located in the other stem portion whereby either valve is made operable from the same point in the automobile.

8. Gas regulating means for automobiles and the like adapted to be placed intermediate of the gas tank and the lamps, said means comprising a member provided with a number of communicating gas passages, all of said passages extending to the periphery of the member, a pair of valves arranged one in advance of the other whereby the flow of gas through said passages may be controlled, the stem of one of said valves being elongated, a sleeve surrounding said elongated stem, means intermediate of said sleeve and the stem of the other valve whereby said last mentioned valve may be operated, and mechanism arranged to have operative connection with said elongated stem when in one position and operative connection with said sleeve when in a second position.

9. Gas regulating means for automobiles and the like, comprising a member provided with communicating passages arranged at angles to one another, one end of each of said passages terminating at the periphery of said member, a pair of needle valves arranged one in advance of the other whereby the flow of gas from one passage into the adjacent passage may be controlled, the stem of one of said valves being elongated, means whereby a gas tight connection is formed at the point where the stems of said valves extend through said member, a sleeve concentrically mounted on said elongated stem, pinions intermediate of the sleeve and the stem of the other valve whereby said last mentioned valve may be operated upon the rotation of said sleeve, and an operating member or key provided with concentric openings, one of said openings being arranged to fit the elongated stem while the other opening is arranged to fit said sleeve.

10. In gas regulating means of the class described, the combination of a pair of valves arranged one in advance of the other and adapted to be placed intermediate of a gas tank and lamps, means intermediate of the valves whereby one of said valves may be operated from the point of control of the other valve, concentric members for controlling the respective valves, with a key provided with openings, one of which is adapted to fit one of said concentric members while the other opening is arranged to fit the other of said concentric members.

11. In combination with the gas tank and gas lamps of an automobile, regulating means intermediate of the gas tank and said lamps, comprising a set of valves arranged one in advance of the other, each of which is adapted to independently control the flow of gas, a pair of concentric members arranged above one of said valves, one of said concentric members being connected to one of the valves, means intermediate of one of said concentric members and the other valve whereby either valve is made operable from the same point in the automobile, and mechanism adapted to operate one of said concentric members when in one position and the other concentric member when in an inverted position.

EDWARD J. GOLDBLATT.

Witnesses:
 GEORGE HEIDMAN,
 R. E. WIGHTON.